Patented Nov. 11, 1952

2,617,741

UNITED STATES PATENT OFFICE 2,617,741

ELECTROCONDUCTIVE ARTICLE AND PRODUCTION THEREOF

William O. Lytle, New Kensington, Pa., assignor to Pittsburgh Plate Glass Company, Allegheny County, Pa., a corporation of Pennsylvania No Drawing. Application December 19, 1951, Serial No. 262,471

13 Claims. (Cl. 117—54)

This invention relates to the production of transparent films or coatings upon lime soda glass and to novel glass products having electroconductive coatings. In United States Letters Patent No. 2,118,795 granted to J. T. Littleton, a process is described wherein an electroconductive coating is deposited upon a glass insulator by heating the insulator to a temperature of 600 to 750° C. and subjecting the hot insulator to the action of stannic chloride. The films thus deposited are stated to be iridescent and transparent to solar heat and are said to improve the properties of insulators.

Since such films possess some transparency, attempts have been made to apply them to transparent plate or window glass sheets to be used as viewing closures and to make use of the conductive film as heating elements in an electrical circuit in order to heat the glass and thus to prevent or minimize formation of fog, snow or ice thereupon. However, serious problems arise from such attempts. If the films are deposited, according to the process of the above patent at a temperature of about 1100–1150° F. or below, in a thickness sufficient to give the film a relatively high electroconductivity so that a relatively low voltage, for example 6 to 220 volts, may be applied effectively thereto, the films frequently have poor transparency and may even be opaque. On the other hand, films which are sufficiently thin to have good transparency often have electrical resistance well above 1000 to 2000 ohms per unit square. While some improvement is possible at higher temperatures, treatment of soda lime glass except in thick sections becomes objectionable because of the tendency of the glass to soften objectionably. The expression of electrical resistance in terms of ohms per unit square is a convenient method of expressing the resistance of thin films and in reality is the specific resistivity of the film divided by the average film thickness within the area of a square.

Further research has led to the discovery that by use of proper precautions and special solutions, transparent films can be provided on soda lime glass which have unusually low electrical resistance. Thus, it has been found that the use of certain agents such as methanol or phenyl hydrazine hydrochloride in conjunction with stannic chloride produces a transparent coating which has a resistance in terms of ohms per unit square below 500 and generally below 150. Such low electrical resistance has made possible the provision of viewing closures in the cabins of automotive vehicles such as aircraft and automobiles which have a transparent surface which closures may be electrically heated in a convenient manner. The provision of such an article affords a convenient means of preventing accumulation of fog, ice or snow upon the viewing closure, simply by electrically heating the glass, using the transparent films as the resistance element.

Despite the fact that the above process permits production on a large scale of viewing closures having conductive films with electrical resistance below 500 ohms per unit square, a portion of products thus produced have been defective due to the presence of haze in the film. This haze sometimes developed in localized areas of the glass sheet and at other times, the entire surface of certain articles was found to be hazy. In consequence, an undue number of glass panels have been rejected as unsuitable for use as viewing closures. Losses due to these "rejects" have very materially increased the cost of production of suitable viewing closures.

According to the present invention, it has been found that haze and similar defects may be eliminated or substantially reduced by providing between the base and the electroconductive coating an intermediate layer, film or coating a refractory transparent metal oxide material or like refractory material which either is free of Na$_2$O or which has a content of available Na$_2$O lower than that of the surface of soda lime glass which has been heated for one or several minutes to the temperature at which the electroconductive coating is to be applied (usually above 400° F., for example 1150° F.). Preferably the Na$_2$O content of the surface if present should be below that of the interior of the soda lime glass.

The reduction in haze which accrues by virtue of this process is effected by restricting the amount of alkali metal which is permitted to come into contact with the electroconductive film during formation. It will be understood that ordinary soda lime glass contains a certain minimum of alkali metal as Na$_2$O and K$_2$O. When such glass is heated, for example above 400° F. for one or more minutes further amounts of alkali metal migrate to the surface and the surface concentration thereof becomes quite high. Hence as stannic chloride or similar compound is applied to the base alkali metal salt is formed and becomes entrapped in the coating being formed thus causing haze.

The intermediate surface, film or layer restrains migration of the alkali metal. Consequently haze formation will be minimized if the intermediate film contains no alkali metal or at least less alkali metal (K$_2$O and Na$_2$O for example) than does the glass surface after heating to the temperature at which the electroconductive film is applied.

In the usual practice of the invention, the glass is cleaned and coated with a then transparent layer of the refractory coating. This film is quite thin, usually having a thickness below 100 millimicrons and rarely being above 300 millimicrons. Where sheets of glass are treated, it is advantageous to apply or form the film upon both sides of the glass in order to avoid any tendency toward warping during the subsequent coating operation.

Following this coating operation, the glass is heated above 400° F., preferably 800 to 1250° F. and the heated sheet is sprayed or otherwise contacted with an hydrolyzable metal compound, such as stannic chloride, which is capable of producing a transparent electroconductive coating upon the treated surface of the glass, usually upon one side of the sheet. Care should be exerted to avoid an excessively long heating period since alkali metal in the interior of the glass tends to migrate to the surface through the refractory layer to an objectionable degree thus causing haze formation. Consequently, heating should be discontinued and the electroconductive film should be applied before such migration can occur to a degree such as to raise the alkali metal atom concentration at the surface of the silica coating to the point where the $Na_2O$ content of the coating is substantially that of untreated glass when heated to the same temperature.

This invention is applicable to use in connection with the treatment of window glass or plate glass, i. e. soda lime glass, since haze which develops due to the presence of alkali does not appear to be serious with other forms of glass. Furthermore, it is of particular importance when metal halides, such as stannic chloride, are used to form or deposit the transparent electroconductive film.

Various refractory compositions may be applied according to this invention. In general, suitable refractory films may be applied by spraying the glass at a temperature of 800 to 1250° F. with a saturated or other relatively concentrated aqueous solution of a soluble salt of copper, aluminum, lead, zinc, iron, nickel, cobalt, thallium or silver. Clearest films are obtained using the acetates of these metals. However, the chlorides, bromides, iodides, nitrates, and nitriles also may be used. For example, a coating, believed to comprise silver oxide, may be applied by spraying glass heated to a temperature above about 400° F., for example, 800 to 1250° F., with a saturated aqueous silver nitrate solution. Coatings of aluminum oxide may be applied in a similar way by spraying with an aqueous solution of an aluminum salt, such as aluminum chloride, acetate, bromide or nitrate. Similar results may be obtained using saturated salts of aqueous solutions of antimony trichloride or pentachloride. Boron-containing films may be applied by spraying the hot glass with boron trifluoride or boric acid.

Titanium films may be deposited by dipping the glass in titanium tetrachloride or the reaction product obtained by mixing titanium tetrachloride with 2–10 per cent by weight of ethyl alcohol or an equivalent amount of lower aliphatic alcohol containing up to 5 carbon atoms. They may also be provided by spraying glass heated to about 220° C. with tetanium tetrachloride in atmospheric air.

The exact composition of the intermediate film provided is not known with absolute certainty and is difficult to determine because of its thinness. Usually it comprises an oxygen compound, i. e. an oxide of the metal used, which may or may not be in combination with silica.

The treated glass is heated to a temperature above about 400° F., usually 800 to 1250° F., but below the temperature at which the glass melts. The heated glass is sprayed with the metal compound such as stannic chloride (usually in air which possesses some amount of moisture characteristic of atmospheric air). The period of heating should be limited since, if heating is continued for an excessive period migration of alkali metal atoms from the interior of the glass through the silica film tends to occur thereby nullifying the effect of the silica film. Usually, a heating period of 1 to 10 minutes is sufficient for the purpose. Longer times are permissible so long as the amount of alkali metal diffusion does not become excessive, but rarely is heating continued over one hour.

When the glass has been heated to the above temperature, it is withdrawn from the heating zone and immediately is sprayed in atmospheric air of natural humidity (usually 30 percent or above) with the coating compound either as a vapor or solution. When a solution is used, a quantity of the coating solution is placed in an atomizing spray gun and the hot glass is sprayed with an atomized spray of the solution for a few seconds, usually of the order of 1 to 20 seconds. Usually this coating operation is conducted in the presence of an oxygen source such as water, air or oxygen. Conductive coatings have been obtained when air did not appear to be present although it is probable that oxygen available either as elemental oxygen or combined in water or similar compound is essential to this operation.

When a tin compound, such as stannic chloride, stannous chloride, stannous acetate, stannous phosphate, stannis phosphate, stannous oxalate or equivalent hydrolyzable tin compound, is used as the coating material, the process produces a transparent electroconductive film which largely comprises an oxide of tin. Such films are at least 95–99 percent tin oxide and contain certain impurities such as chlorine, carbon and silicon, together with some amount of elemental tin.

In depositing films upon soda lime glass, it has been found that certain agents, notably methanol and phenyl hydrazine hydrochloride or antimony trichloride materially improve the coating particularly as to its electroconductivity. A wide variety of other agents of this character such as those described in an application of W. O. Lytle for United States Letters Patent, Serial No. 762,658, filed July 22, 1947 may be used.

The amount of the addition agent which is used is capable of substantial variation depending upon the results desired. Small amounts (even traces) show an improvement in the conductivity and freedom from haze of the film and such improvement increases to a maximum as the amount of addition agent is increased. In general the amount of such agent which is used in conjunction with the tin compound at least 0.01 to 0.1 mol per mol of tin compound. As an example, with agents such as methanol it has been found that a solution comprising 1000 parts by weight of $SnCl_4 \cdot 5H_2O$ and 1 part by weight of methanol produced a film having a specific resistivity of about 0.012 ohm centimeter, whereas a solution containing equal parts by weight of stannic chloride pentahydrate and methanol produced a film having a specific resistivity below 0.002. Since larger amounts of such agents do not produce markedly greater improvement of the film, it is quite rare to use more than 50 parts by weight of addition agent per part by weight of tin compound.

Quite frequently, mixtures of agents have been found to be preferable. For example, alcohols such as methanol or others above listed are found to function better when used with hydrazines such as phenyl hydrazine or phenyl hydrazine hydrochloride or other hydrazines or their hydrochlorides. In such a case at least 0.01 mol of the hydrazine such as phenyl hydrazine and 0.01 mol of the alcohol such as methanol, per mol of tin compound such as stannic chloride normally are used.

The invention has been described with special reference to the use of stannic chloride as the tin compound for production of the electroconductive film. This compound is particularly valuable since it may be used either in aqueous medium or in vapor state to produce films which visibly appear to be flawless. Other film forming tin (particularly compounds which are hydrolyzable or decomposable to produce a tin oxide electroconductive coating) are useful for this purpose. Thus, compounds such as stannic bromide, $SnBr_3Cl$, $SnBrCl_3$, $SnCl_2I_2$, $SnI_4$, stannic sulphate, stannic phosphate, stannic nitrate or stannous salts such as stannous acetate, stannous oxalate, stannous chloride, stannous nitrate, stannous tartarate or stannous phosphate may be used. Organic tin compounds also may be used. Such compounds include those having the structure $R_mSnX_n$ where R is a monovalent aryl, aliphatic, or aryl-aliphatic radical linked to the tin atom through carbon and X is another monovalent aryl, aliphatic or aryl-aliphatic radical linked to the tin atom through carbon or is a radical such as hydroxyl, chloride, bromide, iodine, etc. and the sum of $m$ and $n$ is 4, such as tetra ethyl tin, tetra methyl tin, tetra-n-heptyl tin, tetrabenzyl tin, tetra phenyl tin, tetra-p-tolyl tin, tetra-p-xylyl tin, tribenzyl ethyl tin, tribenzyl tin chloride, tributyl tin chloride, triethyl-n-amyl tin, tolyl tin trichloride, ethyl tin tribromide, ethyl stannic acid, ethyl chlorostannic acid, diethyl tin oxide. Moreover, other tin compounds such as diphenyl tin, diethyl tin, stannic bis-acetylacetone dichloride or dibromide, etc. may be used.

In general it is desired to use tin compounds which are liquid or which may be vaporized readily or which may be dissolved in solvents such as water or organic solvents such as benzene, xylene, toluene, acetone, methanol ethanol, methyl ethyl ketone, etc., in order that the tin compound may be applied to the base as a homogeneous liquid or solution. Such solutions normally contain at least 10 to 50 parts by weight of tin compound per 100 parts by weight of solution.

According to a further embodiment mixed oxides may be applied. For example, an aqueous solution containing the usual amount of stannic chloride or other tin compound may have dissolved therein or mixed therewith compounds of other metals such as indium chloride, cadmium bromide, cadmium acetate, zinc bromide, zinc acetate, thallium nitrate, chromium chloride, ferric chloride or other compound of these metals to modify the properties of the film. As a typical embodiment, 10 to 500 percent by weight of thallium nitrate or cadmium chloride or acetate based upon the weight of stannic chloride in the solution may be added to the solutions of Examples 1, 2, 3 or 4 adding sufficient water if necessary to dissolve the mixture and these solutions may be used in lieu of the solutions described in such examples.

Not infrequently, it is desirable to apply the transparent coating to the dealkalized glass base by recourse to a vaporized tin compound such as stannic chloride vapor. In such a case the vapor of the tin compound may be mixed with the vapor of the addition agent (methanol, etc.) and the vapor mixture sprayed upon the glass base.

During the coating operation whether by use of anhydrous vapor or aqueous solution of the tin compound, the hot glass normally is supported by convenient means in atmospheric air which normally contains some moisture (relative humidity usually above 30 percent). Consequently the spraying operation is conducted in the presence of water even if no water is present in the spray itself.

Since the haze which is avoided by recourse to this invention is largely created by sodium, the invention is applicable to the provision of electroconductive coating and upon various types of glass having a high sodium content. These glasses have the composition:

| | |
|---|---|
| Alkali metal oxide such as $Na_2O$ and/or $K_2O$ | 10 to 35% by weight |
| Alkaline earth metal oxide such as CaO and/or MgO | 5 to 25% by weight the CaO content being not less than 5% by weight |
| $SiO_2$ | 50 to 75% by weight |
| $Al_2O_3$ | 0 to 20% by weight |

It will be understood that various other materials, usually in small amount (1 to 5% by weight or less) also may be present. Such materials include arsenic, antimony, fluorine, lithium, barium, zinc, titanium, $B_2O_3$, iron, cobalt, nickel, lead, phosphate and the like.

As previously stated, the invention has been found to be especially valuable when used in the coating of window and plate glass which are made of lime soda glass. Such glass usually has the following compositions:

| | |
|---|---|
| Alkali metal oxide such as $K_2O$ and/or $Na_2O$ | 10 to 18% by weight |
| Alkaline earth metal oxide such as MgO and/or CaO | 5 to 16% by weight the CaO content being at least 5% by weight |
| $SiO_2$ | 65 to 75% by weight |
| $Al_2O_3$ | 0 to 5% by weight |

A typical lime soda glass used as window glass has the following composition:

| | |
|---|---|
| $SiO_2$ | 71.38% by weight (usual variation 71 to 73% by weight) |
| $Na_2O$ | 12.79% by weight (usual variation 12 to 14% by weight) |
| CaO | 9.67% by weight (usual variation 8 to 11% by weight) |
| MgO | 4.33% by weight |
| $Na_2SO_4$ | 0.75% by weight |
| NaCl | 0.12% by weight |
| $Fe_2O_3$ | 0.15% by weight |
| $Al_2O_3$ | 0.81% by weight |

Other pertinent properties of these electroconductive films on lime soda glass are:

| | |
|---|---|
| Mobility cm.$^2$/volt second | 8 |
| No. ionized impurity centers per cm.$^3$ | About $10^{20}$ |
| Mean free path of current carriers | About $6 \times 10^{-6}$ cm. |
| Index of refraction of film | About 2 |
| Haze factor | Below 2.5% |
| Resistivity | Below 0.005 ohm—cm. |

Because of the lower specific resistivity of the films produced according to this invention plate or window glass provided with conductive films of high transparency have a resistance per unit square below 500 and generally less than 150 ohms per unit square.

The haze factor is measured by a method designated "A Tentative Method of Industry For Transparent Plastics By Photoelectric Cell," described in the publication "A. S. T. M. Standards,"

1944, part 3, pages 1653-5, American Society Testing Materials, New York."

The color characteristics of the coating are determined to a substantial degree by the thickness of the coating. Colorless coatings may be obtained by use of tin oxide or similar coatings which are below about 75 to 100 millimicrons in thickness. Thicker coatings having a thickness of 75 to 600 microns possess a color depending upon the exact thickness. The exact thickness of the film depends upon the number of coatings and/or the length of time of spraying. In general, the film thickness will not be in excess of 800 microns.

It will be understood that the article which is produced as described above comprises a soda lime glass base, a transparent electroconductive coating on the base and an intermediate metal oxide layer, film or coating between the base and the electroconductive coating.

The available $Na_2O$ and equivalent alkali metal oxide content of the metal oxide should in no case exceed that of ordinary untreated soda lime glass after heating the untreated glass at an elevated temperature, for example 1150° F. for a period of 4 minutes (or such other time and temperature to be used for heating the glass to the temperature at which the electroconductive film is to be applied). Obviously the film may even be free of alkali metal. However, it should be noted that improvement may be observed through use of films which contain more $Na_2O$ or equivalent alkali metal than ordinary unheated soda lime glass so long as the available $Na_2O$ content is below that of glass which has been heated after formation into sheet or similar product to the temperature at which the electroconductive coating is supplied. Thus it has been found that when plate glass samples, 6 inches by 6 inches by 1/8 inch were immersed in 350 cubic centimeters of water for two hours, the amount of $Na_2O$ which is dissolved in the solution amounts to about 0.05 to 0.4 milligram per square foot of glass surface. On the other hand, when such plates are heated for 4 minutes at 1150° F. and immersed in 350 cubic centimeters of water as above, the $Na_2O$ content of the water amounts to from about 1.5 to as high as 3 (the average being about 2) milligrams per square foot of glass surface.

From the above test it will be apparent that films which exhibit available $Na_2O$ contents according to this test below 1.5 milligrams per square foot should be used. Even films which contain $Na_2O$, such as those formed from aqueous sodium silicate of the composition $Na_2O.(SiO_2)_x$ where $x$ is greater than 3, will effect an improvement in some cases.

The above test affords a convenient method for comparing the available $Na_2O$ content of glass with glass provided with the film herein contemplated. Samples of uncoated glass and coated glass may be heated in a furnace at the temperature for example 1150° F., and for the time for example 4 minutes, to be used in the application of the electroconductive coating. These samples then may be cooled and their surface $Na_2O$ content compared as described above. If the $Na_2O$ content of the coated glass sample is found to be lower than that of the untreated glass sample after such heating, the treated glass will, in general, afford improvement as to haze.

In general, appreciable improvement is obtained when the glass to be coated with the electroconductive film exhibits available surface $Na_2O$ determined as described above is less than 1 milligram and preferably less than 0.5 milligram per square foot of glass surface. The intermediate films produced according to methods herein described usually exhibit available $Na_2O$ contents of 0.05 to 0.4 milligram per square foot even after the glass provided with the film has been heated at 1150° F. for 4 minutes.

These intermediate films or coatings may be separately defined layers or they may be essentially a continuation of the silica skeleton. Thus the term "film" as applied to these intermediate films refers to films which are deposited upon the base and those formed in situ. Consequently, the term is intended to include glass bases whereas the $Na_2O$ content of the surface has been decreased by base exchange or analagous reaction. For example, when soda lime glass is heated at 800° F. or sprayed with vapors or solutions of metal halides such as ferric chloride or cuprous chloride. A film is formed which may exist as a definite layer or as a thin dealkalized surface zone extending from the outside into the interior of the glass without clear demarkation of layer formation.

As noted above, when sheets are treated, it is preferred to apply the metal oxide film to both sides of the sheet to prevent warping during the subsequent application of the electroconductive film. The electroconductive film normally is deposited upon but a single side of the treated surface although it may be applied upon both sides if desired.

The above description has been primarily directed to provision of articles having transparent tin oxide electroconductive films. However, the invention is applicable to transparent electroconductive films generally, all of such films being essentially equivalent. Thus transparent electroconductive films of cadmium oxide or indium oxide may be provided by use of cadmium or indium acetate, chloride or bromide in lieu of stannic chloride. Moreover, mixtures of these compounds with tin chloride or antimony chloride or with themselves may be used. Such coatings largely comprise the oxide or mixed oxide corresponding to the metal compound or compounds applied.

The following examples are illustrative:

*Example 1*

A glass plate is dipped in a solution prepared by adding 5 percent by weight of titanium tetrachloride to ethyl alcohol and cooling the mixture thus obtained. The dipped glass is allowed to dry and is cleaned.

This treated glass is vertically suspended, narrow sides being in a horizontal plane, and is heated in a furnace chamber at a temperature of 1150° F. for 3 minutes. A conventional spray gun is filled with a solution prepared by mixing the following components in the proportions:

Stannic chloride pentahydrate_____grams__ 900
Methanol _____milliliters__ 63
Phenyl hydrazine_____grams__ 21
Dioctyl sodium sulfosuccinate solution _____milliliters__ 30
    This solution is composed of:
        Dioctyl sodium sulfosuccinate _____grams__ 10
        Methanol _____do____ 45
        Water _____do____ 45

The spray gun is turned on and the stannic chloride solution is sprayed evenly upon the hot glass by holding the glass vertically with its front face perpendicular to the spray nozzle and moving the glass across the spray so that the gun is directed at a point midway between the top and bottom edges of the sheet. If necessary several guns mounted one above the other may be used to apply the coating.

The rate of moving the sheet across the spray is such as to require approximately 6 seconds to move a sheet 17 inches by 25 inches entirely through the spray. During this period approximately 20 cc. of solution is sprayed. Following the spraying operation, the sheet is tempered to a temper of approximately one fourth that of full temper.

The resulting sheet has a clear transparent iridescent tin oxide coating which has a resistivity of approximately 125 ohms per unit square. The thickness of the electroconductive coating is 300–400 millimicrons.

*Example 2*

An aqueous solution is prepared by dissolving 4 grams of stannous acetate and 30 milliliters of methanol in enough 12 normal aqueous hydrochloric acid to cause the stannous acetate to dissolve. This solution is allowed to age by standing overnight.

A glass plate, 8 inches by 4 inches by 7/64 inch is treated with a titanium tetrachloride as in Example 1 and is heated in a furnace chamber having a temperature of 1250° F. for 2¼ minutes. 5 milliliters of the aged solution is sprayed in 5 seconds from a conventional atomizing spray gun on the heated glass immediately after its removal from the furnace.

*Example 3*

A small soda lime glass plate was heated for 2½ minutes in a furnace chamber at a temperature of 1150° F. This hot sheet was sprayed for 2.5 seconds at 40 pounds per square inch pressure using a conventional spray gun with an aqueous solution containing 20 percent by weight of silver nitrate and 5 percent by weight of aqueous formaldehyde containing 40 percent by weight of formaldehyde.

The treated glass was cleaned and heated at 1150° F. for 2½ minutes and sprayed for 1.5 seconds at 40 pounds per square inch pressure using a conventional spray gun, with a solution prepared as follows:

Seven grams of phenyl hydrazine hydrochloride was dissolved in 30 milliliters of water. 300 grams of stannic chloride pentahydrate was melted at 140° F. and the two solutions were mixed. A very clear plate was obtained.

This process also may be performed, using the stannic chloride solutions of Example 1. Moreover, saturated aqueous solution of aluminum chloride, copper chloride, antimony chloride, cobalt chloride, nickel chloride, ferrous chloride or zinc chloride may be used in lieu of silver nitrate.

*Example 4*

A sheet of glass is heated to 1200° F. and sprayed with a solution of 30 grams of $TiCl_4$ in 60 grams of methanol. This product is then coated with a tin oxide coating as in Example 1 or 3.

*Example 5*

In a series of tests, polished plate glass sheets 4 inches by 8 inches by 7/64 inch were heated for 2¼ minutes at a furnace temperature of 1250° F. The solutions having the composition indicated below were made up and 15 grams of each solution was sprayed upon the heated glass plate and the plates were allowed to cool.

1. 20 grams zinc acetate—$Zn(C_2H_3O_2)_2.2H_2O$
   50 grams water
   5 grams phenyl hydrazine hydrochloride
2. 75 grams cadmium acetate
   100 grams water
3. 20 grams chromium acetate $Cr(C_2H_3O_2)_3.H_2O$
   50 grams water
4. 50 grams cobalt acetate $Co(C_2H_3O_2)_2.4H_2O$
   50 milliliters water
5. 7 grams copper acetate $Cu(C_2H_3O_2)_2.2H_2O$
   50 grams water
6. 10 grams aluminum acetate $Al_2O(C_2H_3O_2)_4.4H_2O$ 25 milliliters 16 normal ammonium hydroxide
7. 50 grams lead acetate $Pb(C_2H_3O_2)_2.3H_2O$
   100 grams water
8. 30 grams nickel acetate $Ni(C_2H_3O_2)_2.4H_2O$
   60 grams methanol These sheets are coated with a tin oxide coating according to Example 1 or 3.

*Example 6*

Solution of:

40 grams of antimony trichloride
20 milliliters of anhydrous methanol
20 milliliters of concentrated hydrochloric acid (37 percent HCl)
5 milliliters of aqueous hydrogen peroxide containing 30 percent $H_2O_2$ was prepared. Glass sheets 3 inches by 6 inches by 9/64 inch were heated to 800° F. and sprayed with the above solution to produce a film of first or second order violet. These sheets were reheated to 1150° F. and coated with tin oxide by spraying with the stannic chloride solution described in Example 1.

Moreover, the following solution may be used in lieu of the tin solutions in any of the above examples:

1. 2 parts by volume of a saturated aqueous solution of cadmium bromide
   1 part by volume of an aqueous solution containing 30 percent by weight of $H_2O_2$
2. Aqueous indium trichloride solution containing 200 grams of $InCl_3$ per liter.
3. Saturated $InCl_3$ solution in anhydrous methanol containing 1 percent of antimony trichloride or aqueous 48 percent hydrofluoric acid, the 1 percent being based upon the weight of $InCl_3$.
4. Saturated aqueous indium triacetate.
5. 75 grams cadmium acetate
   100 grams water.

The above described products are capable of use wherever transparency and electroconducting are desirable properties. They are especially effective as wind-shields or other viewing closures in vehicles such as automobiles and aircraft which may be constructed as described in the application for United States Letters Patent of William O. Lytle, Serial No. 762,659, filed July 22, 1947 disclosure of which is hereby incorporated by reference.

Thus bus bars may be provided by applying strips of electroconductive metal coating composition along opposite marginal edges of the glass sheet after application of the silica film.

A typical composition which may be used for this purpose is as follows:

| | Per cent by weight |
|---|---|
| PbO | 7.5 |
| $B_2O_3$ | 1.0 |
| $SiO_2$ | 1.5 |
| Flake silver | 70.0 |
| French fat oil | 12.5 |
| Turpentine | 7.5 |

The glass with the applied bus bars may be treated according to any of the above examples. The resulting products may be used as windshields, electrical resistance elements, heating elements, instrument dials, etc.

Although the present invention has been described with reference to the specific details of certain embodiments thereof, it is not intended that such details shall be regarded as limitations upon the scope of the invention except insofar as included in the accompanying claims.

Reference is made to copending applications, Serial Nos. 36,420 and 36,425, both filed July 1, 1948, and now forfeited.

This application is a continuation-in-part of my application Serial No. 36,435, filed July 1, 1948, and now forfeited.

I claim:

1. A transparent glass article which comprises a glass base having the composition:

| | |
|---|---|
| Alkali metal oxide of the group consisting of $Na_2O$ and $K_2O$ | 10 to 35% by weight |
| Alkaline earth metal oxide of the group consisting of CaO and MgO | 5 to 25% by weight the CaO content being at least 5% by weight |
| $SiO_2$ | 50 to 75% by weight |
| $Al_2O_3$ | Up to 20% by weight | having a transparent tin oxide electroconductive coating upon the base and an intermediate transparent metal oxide layer between the base and the coating, the metal oxide of said intermediate layer being a member selected from the group consisting of the oxides of silver, aluminum, antimony, copper, iron, cobalt, nickel, thallium and zinc.

2. The article of claim 1 wherein the glass has the composition:

| | |
|---|---|
| Alkali metal oxide of the group consisting of $Na_2O$ and CaO | 10 to 18% by weight |
| Alkaline earth metal oxide of the group consisting of CaO and MgO | 5 to 16% by weight |
| $SiO_2$ | 65 to 75% by weight |
| $Al_2O_3$ | Up to 5% by weight |

3. The article of claim 1 wherein the intermediate layer is a layer comprising antimony oxide.

4. The article of claim 1 wherein the intermediate layer is a layer comprising silver oxide.

5. The article of claim 1 wherein the intermediate layer is a layer comprising aluminum oxide.

6. A transparent glass article which comprises a glass base having the composition:

| | |
|---|---|
| Alkali metal oxide of the group consisting of $Na_2O$ and $K_2O$ | 10 to 35% by weight |
| Alkaline earth metal oxide of the group consisting of CaO and MgO | 5 to 25% by weight the CaO content being at least 5% by weight |
| $SiO_2$ | 50 to 75% by weight |
| $Al_2O_3$ | Up to 20% by weight | having a transparent electroconductive coating of an oxide of a metal of the group consisting of tin, cadmium and indium upon the base and an intermediate transparent metal oxide layer between the base and the coatings, the metal oxide of said intermediate layer being a member selected from the group consisting of the oxides of silver, aluminum, antimony, copper, iron, cobalt, nickel, thallium and zinc.

7. A method of providing a substantially haze-free glass base having a transparent electroconductive coating thereon, which comprises heating a glass having the composition:

| | |
|---|---|
| Alkali metal oxide of the group consisting of $Na_2O$ and $K_2O$ | 10 to 35% by weight |
| Alkaline earth metal oxide of the group consisting of CaO and MgO | 5 to 25% by weight the CaO content being at least 5% by weight |
| $SiO_2$ | 50 to 75% by weight |
| $Al_2O_3$ | Up to 20% by weight | to a temperature of above about 400° F. but below a temperature at which the glass melts, contacting the hot glass with a film-forming decomposable salt of a metal selected from the group consisting of silver, aluminum, antimony, copper, iron, cobalt, nickel, thallium and zinc whereby to deposit a transparent coating of an oxide of a metal of said group upon a surface of the glass, heating the glass to a temperature above about 400° F. but below the temperature at which the glass melts, and contacting the hot glass with stannic chloride whereby to deposit a transparent electroconductive tin oxide coating upon a treated surface of the glass.

8. A method of providing a substantially haze-free glass base having a transparent electroconductive coating thereon, which comprises heating a glass having the composition:

| | |
|---|---|
| Alkali metal oxide of the group consisting of $Na_2O$ and $K_2O$ | 10 to 35% by weight |
| Alkaline earth metal oxide of the group consisting of CaO and MgO | 5 to 25% by weight the CaO content being at least 5% by weight |
| $SiO_2$ | 50 to 75% by weight |
| $Al_2O_3$ | Up to 20% by weight | to a temperature of above about 400° F. but below a temperature at which the glass melts, contacting the hot glass with a film-forming decomposable salt of a metal selected from the group consisting of silver, aluminum, antimony, copper, iron, cobalt, nickel, thallium and zinc whereby to deposit a transparent coating of an oxide of a metal of said group upon a surface of the glass, heating the glass to a temperature above about 400° F. but below the temperature at which the glass melts, and contacting the hot glass with a decomposable film-forming tin halide whereby to deposit a transparent electroconductive tin oxide coating upon a treated surface of the glass.

9. A method of providing a substantially haze-free glass base having a transparent electroconductive coating thereon, which comprises heating a glass having the composition:

| | |
|---|---|
| Alkali metal oxide of the group consisting of $Na_2O$ and $K_2O$ | 10 to 35% by weight |
| Alkaline earth metal oxide of the group consisting of CaO and MgO | 5 to 25% by weight the CaO content being at least 5% by weight |
| $SiO_2$ | 50 to 75% by weight |
| $Al_2O_3$ | Up to 20% by weight | to a temperature of above about 400° F. but below a temperature at which the glass melts, contacting the hot glass with a film-forming decomposable salt of a metal selected from the group consisting of silver, aluminum, antimony, copper, iron, cobalt, nickel, thallium and zinc whereby to deposit a transparent coating of an oxide of a metal of said group upon a surface of the glass, heating the glass to a temperature above about 400° F. but below the temperature at which the glass melts, and contacting the hot glass with a decomposable film-forming compound of a metal selected from the group consisting of indium, cadmium and tin whereby to deposit a transparent electroconductive coating of an oxide of a metal of said last named group upon a treated surface of the glass.

10. The method of claim 9 wherein the transparent metal oxide coating first formed on said glass is antimony oxide.

11. The method of claim 9 wherein the transparent metal oxide coating first formed on said glass is aluminum oxide.

12. The method of claim 9 wherein the transparent metal oxide coating first formed on said glass is silver oxide.

13. The method of claim 9 wherein the film-forming compound of the metal of the group consisting of indium, cadmium and tin is a halide.

WILLIAM O. LYTLE.

REFERENCES CITED

The following references are of record in the file of this patent:

UNITED STATES PATENTS

| Number | Name | Date |
|---|---|---|
| 2,344,250 | Jones | Mar. 14, 1944 |
| 2,366,516 | Geffcken et al. | Jan. 2, 1945 |
| 2,429,420 | McMaster | Oct. 21, 1947 |

FOREIGN PATENTS

| Number | Country | Date |
|---|---|---|
| 113,830 | Australia | Sept. 25, 1941 |